US010571334B2

(12) United States Patent
Oana et al.

(10) Patent No.: US 10,571,334 B2
(45) Date of Patent: Feb. 25, 2020

(54) SYSTEM AND METHOD FOR SELECTIVE RESOLUTION FOR CONCAVE GRATING SPECTROMETER

(71) Applicant: Horiba Instruments Incorporated, Irvine, CA (US)

(72) Inventors: Harry Jerome Oana, Perth Amboy, NJ (US); Xiaomei Tong, Edison, NJ (US); Ronald Joseph Kovach, Edison, NJ (US)

(73) Assignee: HORIBA INSTRUMENTS INCORPORATED, Irvine, CA (US)

( * ) Notice: Subject to any disclaimer, the term of this patent is extended or adjusted under 35 U.S.C. 154(b) by 71 days.

(21) Appl. No.: 15/844,069

(22) Filed: Dec. 15, 2017

(65) Prior Publication Data

US 2019/0186990 A1 Jun. 20, 2019

Related U.S. Application Data

(60) Provisional application No. 62/599,284, filed on Dec. 15, 2017.

(51) Int. Cl.
*G01J 3/02* (2006.01)
*G01J 3/04* (2006.01)
(Continued)

(52) U.S. Cl.
CPC .............. *G01J 3/0256* (2013.01); *G01J 3/021* (2013.01); *G01J 3/0202* (2013.01);
(Continued)

(58) Field of Classification Search
CPC .......... G01J 3/0237; G01J 3/0229; G01J 3/04; G01J 3/1838; G01J 3/40; G01J 2003/045
See application file for complete search history.

(56) References Cited

U.S. PATENT DOCUMENTS 3,927,253 A 12/1975 Jungles et al.
4,618,260 A 10/1986 Okubo
(Continued)

FOREIGN PATENT DOCUMENTS

EP 0803724 A2 10/1997
EP 0933624 A1 8/1999
(Continued)

OTHER PUBLICATIONS

International Search Report and Written Opinion for International Application No. PCT/US2018/065592 dated Mar. 26, 2019.
(Continued)

*Primary Examiner* — Jamil Ahmed
(74) *Attorney, Agent, or Firm* — Brooks Kushman P.C.

(57) ABSTRACT

An optical system includes a spectrograph having a concave diffraction grating and a detector. An aperture is selectively positioned by an associated actuator or positioning mechanism either into, or out of, an optical path of the input light beam downstream of a sample and prior to entering the spectrograph. A slit plate having a plurality of different size entrance slits is positioned downstream of the aperture and movable by an associated actuator or positioning mechanism to position one of the plurality of entrance slits in the optical path of the input light beam. A controller coupled to the detector and the actuators is configured to control the actuators to selectively position the aperture and the slit plate to provide a selectable resolution of the spectrograph. The aperture setting and slit plate setting may be determined from a lookup table in response to a request for finer or coarser spectral resolution.

25 Claims, 4 Drawing Sheets

(51) Int. Cl.
  *G01J 3/18* (2006.01)
  *G01J 3/40* (2006.01)
  *G01J 3/42* (2006.01)
(52) U.S. Cl.
  CPC ........... *G01J 3/0229* (2013.01); *G01J 3/0237* (2013.01); *G01J 3/04* (2013.01); *G01J 3/18* (2013.01); *G01J 3/1838* (2013.01); *G01J 3/40* (2013.01); *G01J 3/42* (2013.01); *G01J 2003/045* (2013.01); *G01J 2003/1842* (2013.01)

(56) References Cited

U.S. PATENT DOCUMENTS

| | | | |
|---|---|---|---|
| 4,691,110 A * | 9/1987 | Nebe | G01J 3/02 250/458.1 |
| 5,515,169 A | 5/1996 | Cargill et al. | |
| 5,646,411 A | 7/1997 | Kain et al. | |
| 5,734,165 A | 3/1998 | Unal et al. | |
| 5,847,400 A | 12/1998 | Kain et al. | |
| 5,972,716 A | 10/1999 | Ragusa et al. | |
| 6,104,938 A | 8/2000 | Huiku et al. | |
| 6,469,311 B1 | 10/2002 | Modlin et al. | |
| 6,795,185 B2 | 9/2004 | Yoshizawa et al. | |
| 7,265,827 B2 | 9/2007 | Slutter et al. | |
| 7,499,809 B2 | 3/2009 | Nagura et al. | |
| 7,782,455 B2 | 8/2010 | Thevenon et al. | |
| 7,812,949 B2 | 10/2010 | Delmas et al. | |
| RE42,822 E | 10/2011 | Slutter et al. | |
| 8,284,397 B2 | 10/2012 | Thevenon et al. | |
| 8,901,513 B2 | 12/2014 | Gilmore et al. | |
| 2002/0109841 A1 | 8/2002 | Gould et al. | |
| 2002/0126278 A1 | 9/2002 | Olshausen | |
| 2004/0135999 A1 | 7/2004 | Sarger et al. | |
| 2006/0124875 A1 | 6/2006 | Yonekawa et al. | |
| 2008/0013086 A1* | 1/2008 | Deck | G01J 3/02 356/328 |
| 2009/0226950 A1 | 9/2009 | Cunningham et al. | |
| 2009/0289200 A1 | 11/2009 | Ishii | |
| 2011/0292376 A1 | 12/2011 | Kukushkin et al. | |
| 2012/0228519 A1* | 9/2012 | Gilmore | G01N 21/645 250/459.1 |
| 2013/0237896 A1 | 9/2013 | Meibaum et al. | |
| 2014/0065717 A1 | 3/2014 | Higashi et al. | |
| 2014/0093948 A1 | 4/2014 | Durrer et al. | |
| 2015/0083903 A1 | 3/2015 | Gilmore et al. | |
| 2015/0106057 A1 | 4/2015 | Sugita et al. | |
| 2016/0011048 A1 | 1/2016 | Niggl et al. | |
| 2016/0265972 A1 | 9/2016 | Simpkin et al. | |
| 2016/0377533 A1 | 12/2016 | Kusaba et al. | |
| 2017/0074794 A1 | 3/2017 | Nakagawa et al. | |
| 2017/0167918 A1 | 6/2017 | Arimoto et al. | |

FOREIGN PATENT DOCUMENTS

| | | |
|---|---|---|
| JP | 11241948 A | 9/1999 |
| JP | 2001264166 A | 9/2001 |
| JP | 2002148112 A | 5/2002 |
| JP | 2002258147 A | 9/2002 |
| JP | 2002267418 A | 9/2002 |
| JP | 2005043142 A | 2/2005 |
| JP | 2006189364 A | 7/2006 |
| JP | 2006194812 A | 7/2006 |
| JP | 2007271528 A | 10/2007 |
| JP | 2010104073 A | 5/2010 |
| JP | 2010190595 A | 9/2010 |
| JP | 2011058818 A | 3/2011 |
| JP | 2015075452 A | 4/2015 |

OTHER PUBLICATIONS

Perkin Elmer; Spectrum One NTS, The Ultimate Near Infrared System for QA/QC; 4 pages; 2003.
Alain Thevenon; Aberrations of Holographic Gratings; pp. 308-315; Oct. 26, 1983, International Technical Conference/Europe; Geneva Switzerland.
Ryan K. Bean et al.; Performance Advantages of Concave Grating Optics in Compact Fiber Optic Spectrometers; Department of Technical Sales, StellarNet Inc., Tampa, FL; May 1, 2016; pp. 1-4.
Horiba Jobin Yvon; VS 140 Low Cost Linear Array Spectrometers; Optical Spectroscopy Division; pp. 1-2; Downloaded Nov. 30, 2017 from http://www.horiba.com/scientific/products/oem-mini-ccd-spectrometers/ccd-pda-spectrometers/.
Horiba Jobin Yvon; Compact Spectrographs—the VS family; pp. 1-5; Downloaded Nov. 30, 2017 from http://www.horiba.com/scientific/products/oem-mini-ccd-spectrometers/ccd-pda-spectrometers/.
Horiba Jobin Yvon; OEM Versatile Spectrograph; Gratings & OEM Division; pp. 1-4; Edison, New Jersey; Downloaded Nov. 30, 2017 from http://www.horiba.com/scientific/products/oem-mini-ccd-spectrometers/ccd-pda-spectrometers/.
International Search Report and Written Opinion for International Application No. PCT/US2018/065232 dated Apr. 24, 2019.

* cited by examiner

SYSTEM AND METHOD FOR SELECTIVE RESOLUTION FOR CONCAVE GRATING SPECTROMETER

CROSS-REFERENCE TO RELATED APPLICATIONS

This application is related to commonly owned and co-pending U.S. patent application Ser. No. 15/844,228, filed Dec. 15, 2017, titled "Compact Spectroscopic Optical Instrument", and commonly owned U.S. Pat. No. 8,901,513, this application claims the benefit under 35 U.S.C. § 119(e) of U.S. Provisional application Ser. No. 62/599,284 filed Dec. 15, 2017, the disclosures of all of the above are hereby incorporated by reference in their entirety.

TECHNICAL FIELD

The present disclosure generally relates to systems and methods for selective resolution enhancement of a spectrometer.

BACKGROUND

The spectral resolution of a concave grating spectrometer generally degrades with an increase in numerical aperture (NA) of grating illumination and spectrometer input slit size. The resolution is a convolution of the dispersion associated with the concave grating groove density, entrance slit size, and optical aberration from the grating, which is affected by the extent of illumination on the grating. A lower dispersion value increases the distance between wavelengths and facilitates higher spectral resolution. A low dispersion spectrometer, usually requires a long distance from the input or entrance slit to the grating and high groove density of the grating. While this provides higher resolution, the associated size of the spectrometer will be bulky. In addition, spectral coverage will be limited due to high groove density.

For spectrometers with compact size (such as less than 100 mm focal length) and broad spectral coverage (such as UV-VIS-NIR wavelengths from 200 nm to 1000 nm), resolution to resolve spectral lines is limited. As such, compromises are typically required when selecting instrument performance parameters for a particular application to achieve desired throughput, resolution, spectral coverage, etc. Known strategies for providing a finer resolution of a concave grating spectrometer include selection or modification of alternative spectrometer components including the diffraction grating and/or detector, for example. Scientific-grade spectrophotometers, which typically cover wavelengths from 200 nm to 1100 nm for general purpose applications, spectrometer resolution less than 2 nm is often required. Thus, these systems rarely utilize compact concave grating-based spectrometers due to the challenge in achieving resolution of less than 2 nm.

For applications that require a finer spectral resolution and compact size, such as an industrial spectrophotometer and fluorometer, a Czerny-Turner spectrometer is commonly used. To achieve a selectable resolution in a Czerny-Turner spectrometer, the input slit size is typically varied by a motorized slit opening. To maintain a good spectral resolution, typical Czerny-Turner spectrometers are designed with an F/# below F/4. Further reduction in the grating illumination area to improve spectrometer resolution is avoided because the system throughput loss will be unacceptable for most applications.

SUMMARY

In one or more embodiments, an optical system includes an aperture configured to be positioned in an optical path of an input light beam downstream of a sample, a slit plate having an entrance slit configured to be selectively positioned in the optical path of the input light beam downstream of the aperture, a concave diffraction grating positioned to receive at least a portion of the input light beam passing through the entrance slit and to diffract the light beam at a wavelength-dependent angle, and a detector positioned to receive light diffracted from the concave diffraction grating and configured to generate a signal in response to the light diffracted from the concave diffraction grating.

Embodiments may include a half-beam aperture configured to pass only a portion of the input light beam, as well as a slit plate comprising a plurality of entrance slits each having a common height and different width relative to one another. A motor or other actuator or positioning mechanism may be associated with the slit plate and configured to position a selected one of the plurality of entrance slits relative to the input light beam. The concave diffraction grating may comprise a holographic grating, which may be aberration corrected, and may be fixed. The optical system may include a housing, wherein the concave diffraction grating and the detector are positioned within the housing, and the aperture is positioned outside of the housing. A fixed aperture may be selectively positionable into the optical path of the input beam, or removed from the optical path to adjust resolution of the spectrometer in combination with a selected entrance slit setting. In various embodiments, the aperture comprises an iris having an adjustable opening. The optical system may have a short focal length of less than 100 mm, for example, for compact size.

One or more embodiments may include an optical system having a spectrograph comprising a concave diffraction grating positioned to receive an input light beam and to diffract the input light beam at a wavelength-dependent angle, and a detector positioned to receive light diffracted from the concave diffraction grating and to generate signals in response to the light received from the concave diffraction grating. The system may include a positioning mechanism configured to selectively position an aperture either into, or out of, an optical path of the input light beam after passing through the sample and prior to entering the spectrograph. The aperture may be positioned either upstream or downstream of a lens that focuses light at a spectrograph input. A slit plate having a plurality of entrance slits is positioned downstream of the aperture and movable by an actuator to position one of the plurality of entrance slits in the optical path of the input light beam. The system may also include a controller coupled to the detector, the positioning mechanism, and the aperture, the controller configured to control the positioning mechanism and the actuator to selectively position the aperture and the slit plate to provide a selectable resolution for light received by the detector of the spectrograph. The spectrograph may have a focal length of less than 100 mm. The concave diffraction grating may comprise a holographic aberration-corrected concave diffraction grating, which may be fixed to a spectrograph housing. The slit plate may have a plurality of slits each having a common height and a different width. The aperture plate may include a plurality of apertures each having different size openings.

Various embodiments include a method for controlling resolution of a spectrograph having a concave diffraction grating configured to diffract an input light beam to a detector. A controller generates a signal to position an aperture in an optical path of the input light beam prior to entering the spectrograph in response to an input requesting finer spectrograph spectral resolution, and generates a signal to remove the aperture from the optical path of the input light beam in response to an input requesting coarser spectrograph spectral resolution. The method may include generating a signal to position a slit plate having a plurality of slits so that a selected one of the plurality of slits is positioned in the optical path of the input light beam between the aperture and the concave diffraction grating of the spectrograph. The plurality of slits may include slits having a common height and a different width. The aperture may be configured to pass a portion of the input light beam.

One or more embodiments according to the present disclosure may provide associated advantages. For example, selective control of resolution of a spectrometer using an external optical element provides greater flexibility to manage resolution and throughput for more diverse applications. The selective positioning of an aperture upstream of the entrance slit in combination with selection of one of a number of entrance slit sizes provides a greater number of bandwidth selections than the available number of entrance slits. This facilitates larger spacing between entrance slits arranged on a slit plate to reduce or eliminate cross-talk between adjacent slits while maintaining a compact size and providing the same number of selectable bandwidths. Use of an aperture with automatic control upstream of a spectrometer input improves spectral resolution for smaller entrance slit settings without changing internal components of the spectrometer, such as the grating or the detector. The resolution performance with an external aperture as described herein provides a compact high-performance package that rivals the performance of a longer focal length optical system, which requires larger size, weight, and cost.

Those of ordinary skill in the art may recognize additional features and advantages of one or more embodiments based on the following detailed description considered together with the accompanying drawings.

DETAILED DESCRIPTION

Various representative embodiments of systems and methods according to the present disclosure are described in detail. However, it is to be understood that the representative embodiments are merely examples and systems and methods according to the present disclosure may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one of ordinary skill in the art to variously employ the claimed subject matter. Simplified flowcharts or block diagrams may be provided to illustrate operation of a representative embodiment of a system or method. Those of ordinary skill in the art will appreciate that the order of steps or processes may not be required for particular applications, that some steps may have been omitted for ease of illustration and description, and that steps or processes may be repeated individually and/or as a subset of the illustrated steps or processes. Likewise, all illustrated or described steps may not be needed to provide one or more of the advantages described herein.

As those of ordinary skill in the art will also understand, various features of the present disclosure as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Figure 1:
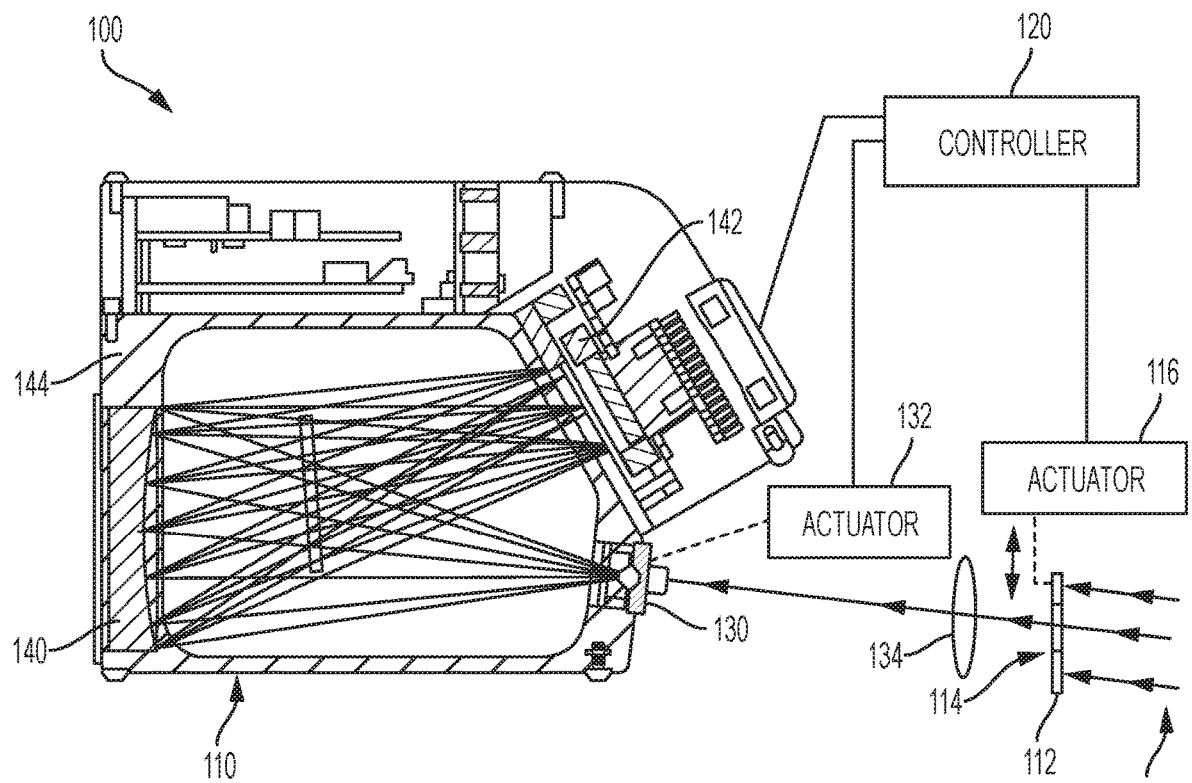
FIG. 1 is a block diagram illustrating an optical system having selective resolution and bandwidth for a concave grating spectrometer according to one or more representative embodiments of the present disclosure.

FIG. 1 is a block diagram illustrating an optical system 100 having selective resolution and bandwidth for a concave grating spectrometer 110 according to one or more representative embodiments of the present disclosure. While spectrometer 110 may be used for a wide variety of applications, in one or more embodiments, spectrometer 110 may be used to obtain fluorescence and absorbance measurements associated with light passing through a sample (not shown) upstream of an input optical beam 118. Optical system 100 may include an aperture plate 112 having an aperture 114. Aperture plate 112 or a similar optical device may be associated with a motor or other actuator 116 to selectively position aperture 114 into, or out of, an optical path of an input beam 118. In one or more embodiments, actuator 116 is implemented by a stepper motor associated with a filter wheel that rotates the filter wheel to position aperture 114 and/or to select one of a plurality of apertures as described herein. An aperture plate as described herein may be alternatively implemented by multiple discrete components each defining an aperture of a different size. Alternatively, a filter wheel may include a "blank" or "empty" position that does not include any optical element, for example.

Actuator 116 may be controlled by a microprocessor-based computer or controller 120 to provide a selectable resolution for light received by spectrograph 110 as described in greater detail herein. In one embodiment, aperture plate 112 includes a single half beam aperture that passes approximately half of the input beam 118 through aperture 112. Stated differently, aperture 112 passes only those light rays within a predetermined angle from an optical center line of the aperture. Various embodiments may include an aperture plate 112 having multiple fixed apertures of different shapes and/or sizes, or an adjustable or variable aperture, such as an iris. In various embodiments, an aperture wheel, filter wheel, or similar positioning mechanism may include one or more components such as an aperture plate 112 having one or more generally circular fixed apertures 114 such as a half beam aperture, quarter beam aperture, ¾ beam aperture, etc. Actuator 116, which may be implemented by a stepper motor, or other computer controlled motor, for example, may position a selected aperture 114 in the optical path of input beam 118 downstream of a sample illuminated by a light source (not shown). As those of ordinary skill in the art will appreciate, selection of an aperture having a size larger than input beam 118 is effectively the same as removing the aperture from the optical path of input beam 118. Optical system 100 may include an optical focusing element, such as a lens 134 positioned downstream of aperture 114. As another example, optical focusing element 134 may be implemented by an off-axis spherical mirror, for example. Focusing element or lens 134 may be positioned to focus light passing through aperture 114 at the entrance of spectrometer 110. Lens 134 may focus the incoming light beam 118 at a selected entrance slit of a slit plate 130 as described in greater detail herein. Optical system 100 will typically include additional components such as a light source, sample holder, folding mirrors, etc. that are not specifically illustrated as the particular components and arrangement of components will depend on the particular application and implementation.

Although illustrated as a single device in the simplified block diagram of FIG. 1, features or functions described as associated with controller 120 may be implemented with multiple controllers that are used to control multiple components of optical system 100 depending on the particular application and implementation. Controller 120 generally represents a controller or computer that may include one or more microprocessors, ASICs, ICs, memory (e.g., FLASH, ROM, RAM, EPROM and/or EEPROM) and software code to perform various functions. Controller 120 may communicate directly with one or more system sensors or actuators and/or over a network using wired or wireless connections.

Controller 120 may be configured or programmed to perform one or more algorithms as generally described herein. Control logic, functions, or algorithms performed by controller 120 may be represented by flow charts or similar diagrams in one or more figures, such as the flowchart of FIGS. 4 and 5, for example. Other logic, functions, or algorithms will be apparent to those of ordinary skill in the art based on the detailed description of various embodiments. The illustrated and described control features and functions provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller, such as controller 120. Of course, the control logic may be implemented in software, hardware, or a combination of software and hardware in one or more controllers depending upon the particular application as previously described. When implemented in software, the control logic may be provided in one or more non-transitory computer-readable storage devices or media having stored data representing code or instructions executed by a computer to control one or more components, process data, provide a user interface to receive user input, etc. The computer-readable storage devices or media may include one or more of a number of known physical devices which utilize electric, magnetic, and/or optical storage to keep executable instructions and associated calibration information, operating variables, measurement data, calculated results, and the like.

As also illustrated in FIG. 1, spectrometer 110 may include a slit plate 130 downstream of lens having at least one entrance slit configured to select the size of the source/sample image focused by optical element 134 positioned downstream of aperture 114. In one or more embodiments, slit plate 130 includes a plurality of entrance slits having different sizes and/or shapes. An associated actuator 132, which may be implemented by a motor, for example, may be controlled by controller 120 to position a selected one of the plurality of entrance slits in the optical path of input beam 118. In one embodiment, actuator 132 is implemented by a stepper motor that rotates slit plate 130 to select one of five slits. The slits are rectangularly shaped and each slit has a common height of 2.5 mm with a different width relative to the other slits with widths ranging from 0.0125 mm to 0.532 mm. Control of actuator 132 and associated positioning of slit plate 130 may be coordinated with control of actuator 116 and associated aperture 114 to provide a selectable resolution and related bandwidth and throughput for light received by spectrograph 110.

Spectrograph or spectrometer 110 includes a concave diffraction grating 140 positioned to receive at least a portion of the input light beam 118 passing through a selected entrance slit of slit plate 130 and to diffract the light beam at a wavelength-dependent angle toward a detector 142. In one or more embodiments, concave diffraction grating 140 is directly or indirectly fixed to housing 144 and does not move during operation of spectrometer 110. In one or more embodiments, concave diffraction grating 140 comprises an aberration-corrected grating, which may be a holographic aberration-corrected grating. Other embodiments may utilize various types of ruled or holographic gratings, including blazed gratings and may or may not be corrected for aberration depending on the particular application. Detector 142 may be implemented by various types of linear charge coupled devices (CCD) imaging detectors and Photo Diode Array (PDA) detectors. An order sorting filter (not specifically illustrated) may be positioned in front of detector 142 to eliminate various issues related to higher orders without degrading optical performance of the system. Spectrometer 110 may also include power/drive electronics, a bus or network interface, and detector cooling depending on the particular application.

As previously described, a spectrometer having a concave diffraction grating provides a compact focal length with a large enough numerical aperture (NA) to provide acceptable throughput for may applications. For example, concave diffraction grating spectrometers may have a numerical aperture of 0.25 NA (F/2). The present inventors have recognized that the higher NA of these spectrometers facilitates use of an upstream aperture to provide additional or enhanced resolution settings while maintaining acceptable throughput relative to conventional concave grating spectrometers that rely only on the size and number of entrance slits to determine the number of available resolution settings or adjustments. Use of such an aperture is generally inapplicable to instruments that rely on a smaller NA to maintain resolution performance, such as Czerny-Turner spectrometers, for example.

As illustrated in FIG. 1, spectrometer 110 includes fixed concave diffraction grating 140 and detector 142 within housing 144. Entrance slit plate 130 may be attached to housing 144, but is generally outside of housing 144. Aperture plate 112 and aperture 114 are positioned outside of housing 144 and upstream of slit plate 130.

In one or more embodiments, spectrometer 110 is a short focal length concave grating spectrometer having a focal length of less than 100 mm. Embodiments include a spectrometer 110 having a focal length of 70 mm. Spectrometer 110 may also have a high numerical aperture, such as greater than (or faster than) 0.25 NA (f/2). In one embodiment, spectrometer 110 has a numeral aperture of 0.22 NA (f/2.2) resulting in high light collection efficiency and excellent throughput to detector 142 positioned at the focal plane.

Figure 2A:
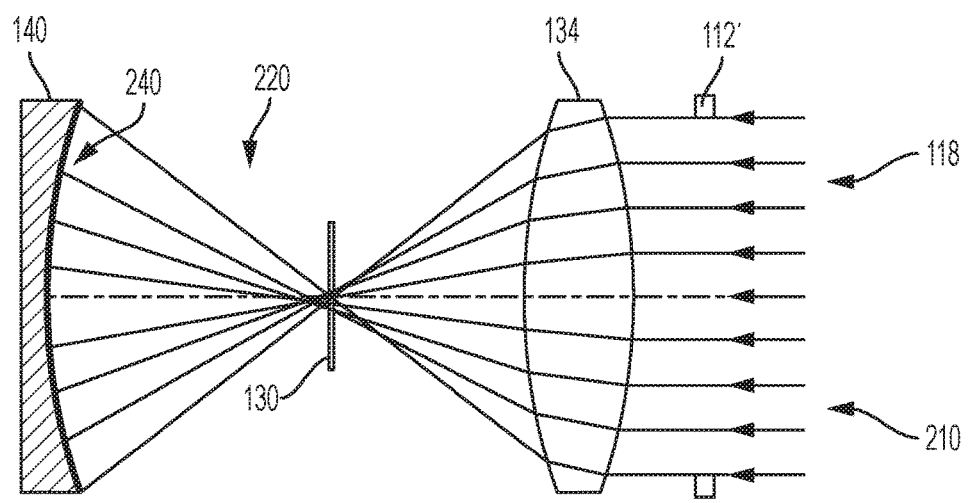
FIGS. 2A and 2B illustrate the effect of an aperture positioned upstream of a concave grating spectrometer to selectively adjust spectral resolution and bandwidth according to one or more representative embodiments of the present disclosure.
Figure 2B:
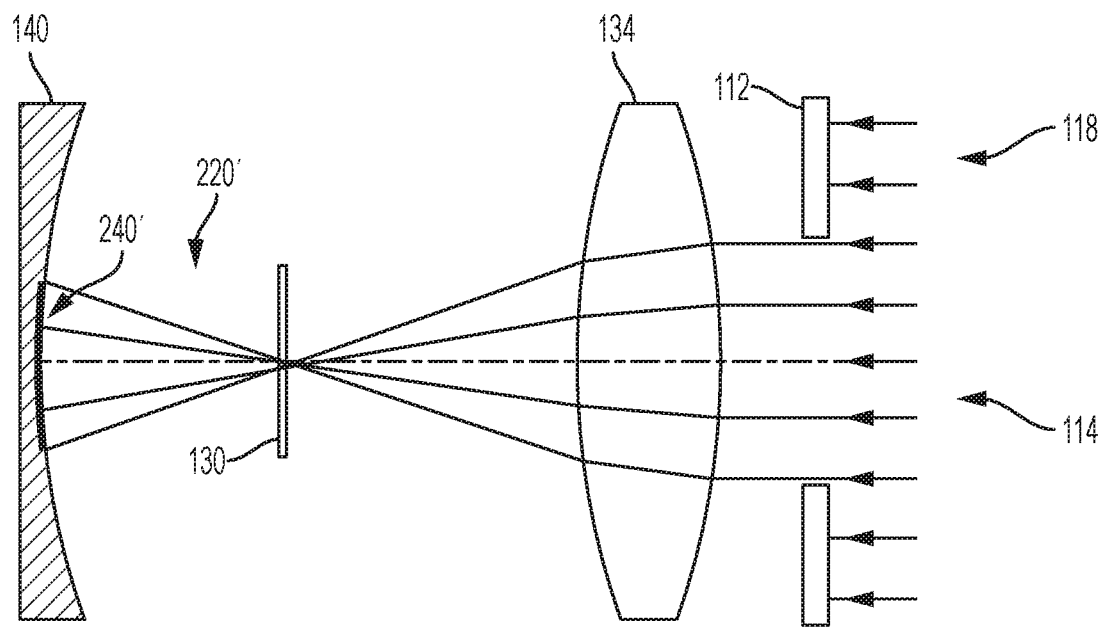

FIGS. 2A and 2B illustrate the effect of an aperture 114 positioned upstream of a concave grating spectrometer 110 to selectively adjust spectral resolution and bandwidth according to one or more representative embodiments of the present disclosure. FIG. 2A illustrates a wide-open aperture 210, or effectively no aperture (larger aperture), in the optical path of the input beam 118. FIG. 2B illustrates a stopped down aperture or smaller aperture 114, which may be a half-beam aperture, for example. In one embodiment aperture 114 is a 15 mm diameter aperture. As illustrated in FIGS. 2A and 2B, positioning an aperture 114 in the optical path of the input beam 118 upstream or downstream of coupling optics, implemented by a focusing lens 134 in the representative embodiment illustrated, reduces the solid angle or cone angle 220, 220' exiting the entrance slit plate 130 and illuminating the fixed concave grating of the spectrometer 110. Selective positioning of aperture 114 in the optical path of the input beam 118 upstream of the entrance slit 130 of spectrograph 110 passes only those rays within a predetermined angle of the optical central axis. Although illustrated as a lens with a collimated beam in FIGS. 2A and 2B, other embodiments may include different optical elements that form a divergent or convergent beam to couple light from a sample onto the entrance slit 130. The coupling optics used to image a testing sample onto the spectrometer entrance slit may be implemented using single element optics, such as a concave mirror, a spherical mirror positioned at an angle, or a lens, which form a divergent or convergent beam, or two optical elements, such as lens pair that forms a collimated beam between two lenses. The aperture may be placed before or after the optical element, but should be positioned close to the optical element to avoid optical vignetting when a single optical element is used. Aperture location is flexible if positioned in a collimated beam region of a lens pair.

As previously noted, aperture 114 defined by aperture disc or plate 112 is not part of spectrometer 110, but spaced from and matched to spectrometer 110 as part of optical system 100 controlled by controller 120. In this manner, only the central rays of the input beam 118 enter spectrograph 110 and only a portion of the fixed concave grating 140 is illuminated by input beam 118 as generally represented by area 240' of FIG. 2B relative to area 240 of FIG. 2A. While introduction of aperture 114 will reduce the sensitivity of optical system 100, the optical resolution is improved, especially at narrower bandwidths. Similarly, introduction of a smaller aperture 114 will further reduce the sensitivity of optical system 100, but will further improve the optical resolution. This controller activated resolution enhancement improves the performance of spectrometer 110 while maintaining as large of a solid angle (f/#) as practical to provide better throughput and allow for shorter optical paths to make a smaller instrument. The resolution performance with an external aperture as described herein provides a compact high-performance package that rivals the performance of a longer focal length optical system, which requires larger size, weight, and cost.

As illustrated in FIGS. 2A and 2B and as generally understood by those of ordinary skill in the art, a concave diffraction grating images in addition to diffracting light. The concave grating is a unique optical element having an input focal plane and an exit focal plane. Entrance slit 130 is positioned at the input focal plane of grating 140. Detector 142 is placed at the exit focal plane of grating 140. Entrance slit 130 functions as a source/object that is imaged and diffracted onto detector 142 by concave grating 140. As the width of entrance slit 130 decreases, the size of the source to be imaged and diffracted by the grating correspondingly decreases. Thus, it improves the spectral resolution of the grating, however, the spectrometer throughput/optical power is reduced. Changing the width of entrance slit 130 does not affect the numerical aperture of illumination of grating 140 because the numerical aperture is determined by the upstream coupling optics positioned between the measurement sample (not shown) and entrance slit 130.

The resolution of a concave grating spectrometer 110 is a convolution of the dispersion influenced by the size of the entrance slit 130 and the image influenced by the extent of illumination on the full grating 140 as generally indicated at 240 and 240'. The following general formula may be used to determine spectrometer spectral bandpass/resolution:

$$\text{Bandpass} = (d\lambda^2_{(slit)} + d\lambda^2_{(aberration)})^{1/2}$$

$d\lambda_{(slit)}$: resolution determined by finite spectrometer slit width and linear dispersion of the grating.

$d\lambda_{(aberration)}$: resolution incorporates system aberration, which is affected by grating geometry and grating illumination numerical aperture.

More specifically, the term $d\lambda_{(aberration)}$ is a product of the amount of aberration $\Delta$ with linear dispersion of the grating, which can be represented by:

$$d\lambda_{(aberration)} = \Delta \times \text{linear dispersion}$$

The amount of aberration $\Delta$ in a concave grating can be calculated as described in detail in a paper by Alain Thevenon titled "Aberrations Of Holographic Gratings," SPIE Proceedings Vol. 0399, Optical System Design, Analysis, and Production; (1983), the disclosure of which is hereby incorporated by reference in its entirety.

In a simplified way, optical aberration $\Delta$ in a concave grating is a function of the numerical aperture of the grating ($NA_{grating}$) and its user geometry i.e. $\Delta = f(NA_{grating}, \text{user geometry})$. The relationship between the aperture in the coupling optics positioned upstream of the entrance slit and downstream of the sample according to embodiments of the present disclosure that image the measurement sample onto the spectrometer input slit, and the grating numerical aperture may be represented by:

Case 1: lens pair with aperture placed in the collimated beam $$\frac{D}{2 * FL(\text{focusing lens})} = NA_{grating}$$

where, D represents the diameter of the aperture opening and FL represents the focal length of the focusing lens in the coupling optics.

Case 2: single lens or concave mirror $$\frac{D}{2*L} = NA_{grating}$$

where D represents the diameter of the aperture opening, and L represents the distance from the aperture to the testing sample if the aperture is placed before the focusing element. If the aperture is placed after the focusing element, L represents the distance from the aperture to the entrance slit. Therefore, when D decreases, grating illumination NA is decreased, leading to reduced aberration (A). As a result, the resolution component $d\lambda_{(aberration)}$ is reduced.

Spectrometer bandpass improvements can be achieved using either method based on the above. A decrease in slit width results in a corresponding $d\lambda_{(slit)}$ decrease. Reducing the numerical aperture of grating illumination as described herein using an aperture 114 positioned between the coupling optics and entrance slit 130 results in a corresponding decrease in $d\lambda_{(aberration)}$. For large slit openings, the $d\lambda_{(slit)}$ is the dominant factor affecting spectrometer resolution. In contrast, for narrow slit openings the image quality $d\lambda_{(aberration)}$ becomes the dominant factor. In the latter case, positioning of an aperture 114 in the optical path of the input beam to the spectrometer between the coupling optics from a sample and the entrance slit of the spectrometer limits the NA of grating illumination so that only the central rays of the beam enter the spectrograph and only part of the grating 240' is illuminated as illustrated in FIG. 2B. As a result, the aberration from the grating is reduced. While use of an aperture 114 will reduce the sensitivity of the system somewhat, it improves the optical resolution, especially at narrower bandwidths.

As generally illustrated and described with respect to FIGS. 1 and 2, optical system 100 includes at least two aperture settings associated with aperture device or plate 112 that may be selected to adjust resolution and associated throughput. The at least two aperture settings pass different amounts of input light beam 118 and are controlled by actuator 116, which may be implemented by a filter wheel having an associated motor, for example. The at least two aperture settings may include a first setting having an aperture that passes only a portion of the input light beam 118 to improve resolution of spectrometer 110, and a second setting with the aperture removed from the optical path so that all of the input light beam 118 passes to spectrometer 110. Alternatively, the second setting may be implemented by positioning of a large aperture in the optical path that passes substantially all of the input light beam 118. Similarly, the first setting may be provided by a first aperture having a first size (smaller) opening positioned in the optical path by actuator 116, and the second setting may be provided by positioning a second aperture having a second size (larger) opening in the optical path by actuator 116. As previously described, the first and second settings may be provided by associated first (smaller) and second (larger) settings of an adjustable or variable aperture, such as an iris, for example. Apertures 114 provided upstream of the input to spectrometer 110 may be substantially circular in shape while those used for the entrance slit 130 may be rectangular in shape as illustrated and described in greater detail with respect to FIG. 3.

As those of ordinary skill in the art will appreciate, the entrance slit 130 for spectrometer 110 and aperture 114 are both openings, but have different geometries, positions, and functions within optical system 100. Entrance slit 130 is generally rectangular in shape having a height based on the size of concave grating 140 and detector 142, with different entrance slits 130 having different widths. The entrance slit 130 is positioned at the input focal plane of the concave grating 140. Entrance slit 130 defines the size and shape of a source/object to be imaged and diffracted by concave grating 140 onto the detector 142. As previously described, a smaller slit width will yield a better spectral resolution of the spectrometer 110. Entrance slit 130 is positioned at the focal plane of coupling optics, such as lens 134, which image the testing sample (not shown) onto the input of spectrometer 110. The coincidence of the focal plane of the coupling optics, the input focal plane of the concave grating 140, and the entrance slit results in best throughput of the optical system. Alternatively, selective positioning of aperture 114 in the optical path between the testing sample and slit 130 results in blocking of part of the input beam that would otherwise enter into the concave grating 140. Passing only smaller angle rays by positioning of aperture 114 reduces aberration of concave grating 140 such that a sharper image of the entrance slit 130 will be formed at detector 142. As a result, the resolving power of spectrometer 110, which is the ability of detector 142 to distinctly separate groups of wavelengths for processing, will be improved.

Selective positioning of an aperture in the optical path of the input beam according to the present disclosure increases the number of selectable bandwidths so that the number of selectable bandwidths is greater than the number of entrance slits in the spectrometer slit plate. In general, use of a selectable aperture upstream of the slit plate provides twice as many spectral bandwidths as the number of slits in the slit plate, although the bandwidth differences decrease with increasing slit widths. In one embodiment having a slit plate with five selectable slits and a half beam aperture, eight selectable bandwidths with notable differences are available as described in greater detail with reference to FIG. 3.

Figure 3:
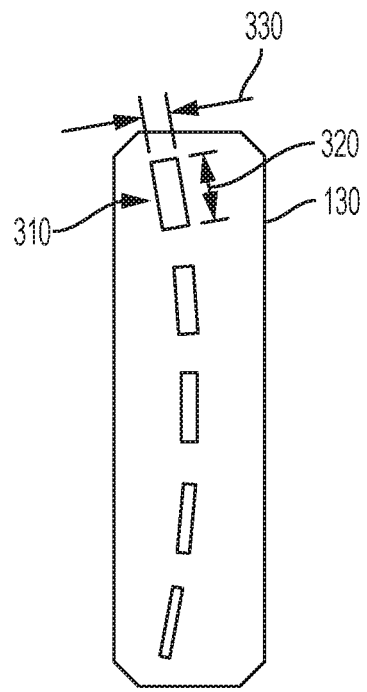
FIG. 3 illustrates a representative slit plate for use in an optical system having selective resolution and bandwidth for a concave grating spectrometer according to one or more representative embodiments of the present disclosure.

FIG. 3 illustrates a representative slit plate for use in an optical system having selective resolution and bandwidth for a concave grating spectrometer according to one or more representative embodiments of the present disclosure. Slit plate 130 includes one or more entrance slits 310. In the representative embodiment illustrated, slit plate 130 includes a plurality of entrance slits including five entrance slits having the same (common) height 320 and varying widths 330. Other embodiments may include a different number of slits 130. Similarly, slits 130 may have different sizes and/or shapes depending on the particular application and implementation. In the representative embodiment of FIG. 3, slit plate 130 is configured with slits 310 arranged in an arcuate manner so that slit plate 130 can be rotated by an associated actuator or actuator assembly to position a selected one of the plurality of slits 310 in the optical path of the input beam to the spectrometer.

Slit plate 130 may also be implemented in sizes and shapes other than the configuration illustrated in FIG. 3. In one embodiment, slit plate 130 is a metallic plate having five slits 310 arranged in a semi-circular arc or segment. Each slit in this embodiment has a height 320 of 2.5 mm and different widths ranging from 0.0125 mm to 0.532 mm. Slit plate 130 is positioned at the entrance of the spectrometer 110 and rotated via an associated stepper motor actuator 132 in response to signals from controller 120 to provide a selectable optical resolution and bandwidth. In one embodiment, slit plate 130 is rotated in response to an input from a user interface communicating with controller 120 requesting a finer resolution to change a selected one of the plurality of slits 310 from a first slit having a larger aperture (larger width in this example) to a second slit have a smaller aperture (smaller width in this example). Control of a selected slit 310 may be coordinated with positioning of an aperture upstream of slit plate 130 by controller 120 to provide a selected change in resolution.

As illustrated in the representative embodiment of FIG. 3, each slit 310 has a specific physical opening width (and height) that may be associated with a desired resolution of the spectrometer 110. Slit plate 130 is then mounted onto an actuator assembly having a slit arm which is then coupled to an associated slit stepper motor in communication with computer or controller 120. The computer control system can be programmed or configured to automatically select one of the plurality of slits 310 and move the selected slit into the optical path of the input beam to set the resolution of the spectrometer via a lookup table stored in memory, for example, or via a manual user selection via a user interface. The resolution of a concave grating spectrometer is a convolution of the dispersion influenced by the slit size and the image influenced by the extent of illumination on the full concave grating as previously described. For larger slit settings, the slit dispersion is the dominant factor. However, at smaller slit openings, the image quality becomes the dominant factor.

The selective positioning of an aperture upstream of the entrance slit in combination with selection of one of a number of entrance slit sizes provides a greater number of bandwidth selections than the available number of entrance slits as previously described. This facilitates use of a reduced number of entrance slits and/or larger spacing between entrance slits arranged on a slit plate to reduce or eliminate cross-talk between adjacent slits while maintaining a compact size and providing the same number of selectable bandwidths.

Because of the very short focal length and wide acceptance angle of spectrometer 110, the ultimate resolution is limited to approximately 1.5 nm, full width half maximum (FWHM) in one embodiment. This limit is partially due to the higher angle rays entering the selected entrance slit, which end up causing aberrations in the image plane of detector 142. According to one or more embodiments of the present disclosure, a computer or controller controlled aperture plate 112 having one or more fixed apertures (or a controllable variable aperture) 114 may be positioned in the input optical light path in response to an input requesting finer spectrometer spectral resolution. This provides two different cone angles (corresponding to the aperture being in the optical path, or no aperture in the optical path) for each physical entrance slit width of the slit plate 130. The following table illustrates available resolution for a representative embodiment having five entrance slits and a positionable half beam aperture. As shown in the table, each entrance slit can be used to achieve two different resolutions based on the aperture setting (with or without aperture). This facilitates a smaller and less expensive system for various applications, including fluorometers, for example.

|  | Physical Size (microns) | Without Aperture Full Beam Spectral Resolution (nm) | With Aperture Half Beam Spectral Resolution (nm) |
| --- | --- | --- | --- |
| Slit 1 | 12.5 | 1.5 | 1 |
| Slit 2 | 40 | 3 | 2 |
| Slit 3 | 95 | 5 | <5 |
| Slit 4 | 242 | 10 | <10 |
| Slit 5 | 532 | 20 | <20 |

As previously described, there are various design compromises to provide high resolution in a spectrometer relative to cost, system size, and performance. The present inventors have recognized that use of an upstream aperture as described herein provides an instrument with improved resolution without associated compromises in cost or instrument size.

Figure 4:
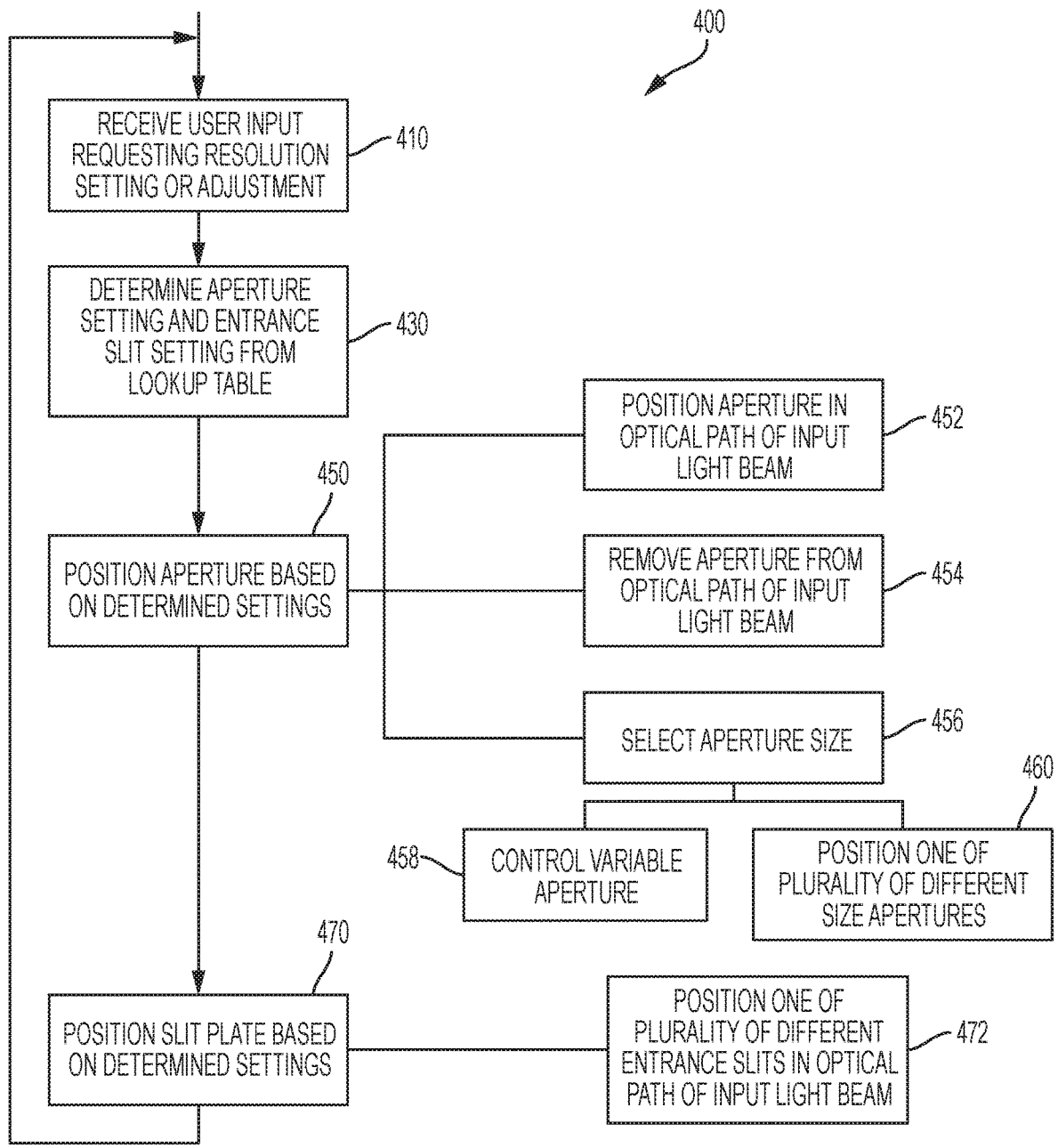
FIG. 4 is a flowchart illustrating operation of a representative embodiment of an optical system having selective resolution and bandwidth for a concave grating spectrometer according to one or more representative embodiments of the present disclosure.
Figure 5:
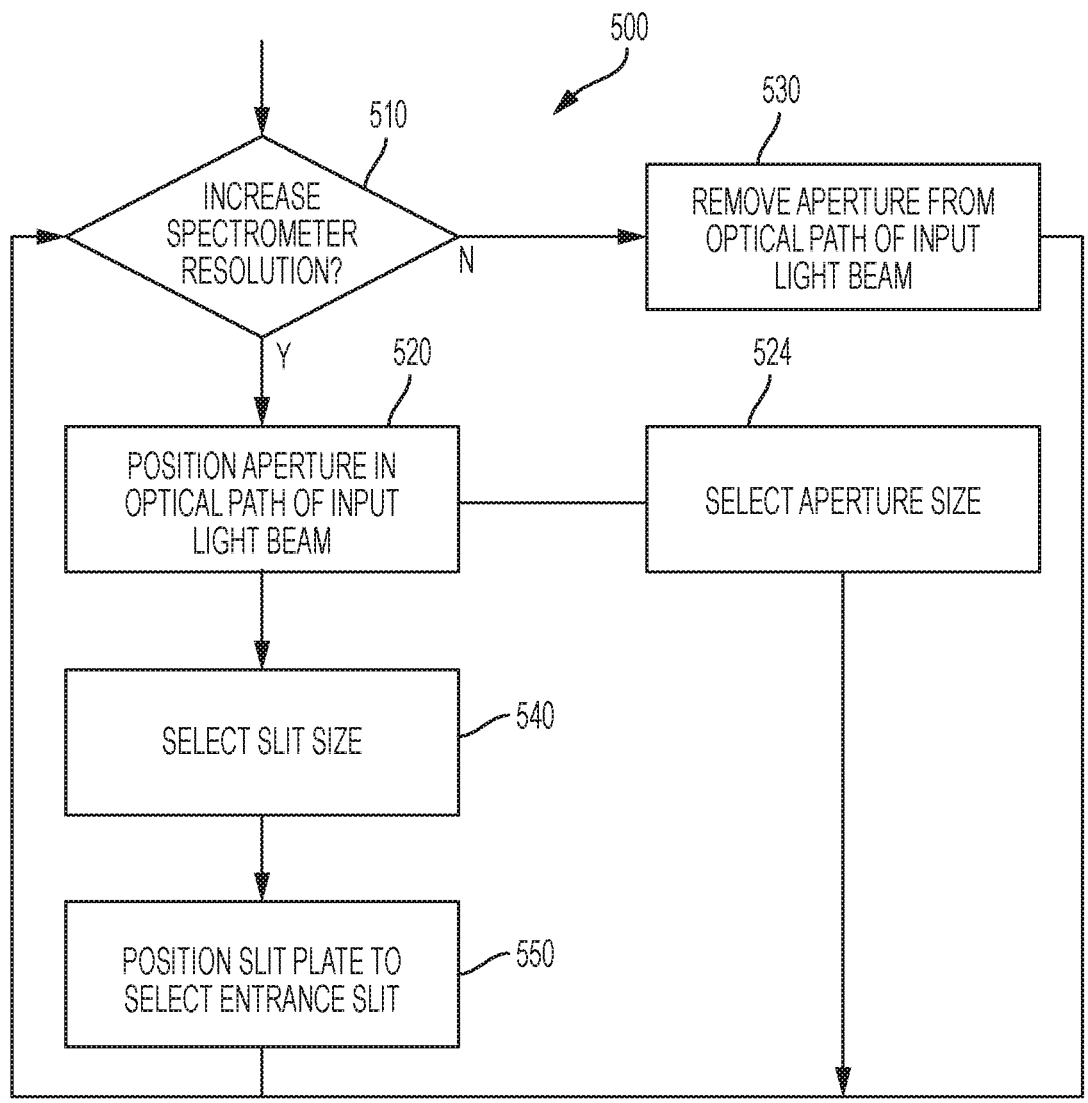
FIG. 5 is a flowchart illustrating operation of another representative embodiment of an optical system having selective resolution and bandwidth for a concave grating spectrometer according to one or more representative embodiments of the present disclosure.

FIGS. 4 and 5 are flowcharts illustrating operation of representative embodiments of an optical system having selective resolution and bandwidth for a concave grating spectrometer according to the present disclosure. In one or more embodiments, the optical system or method is used in a fluorometer. The control logic or algorithms 400 and 500 represented in FIGS. 4 and 5, respectively, may be implemented by one or more controllers configured or programmed to control one or more components of an optical system having a concave diffraction grating configured to diffract an input light beam to a detector as previously described. In response to an input requesting a specific resolution setting or a finer or coarser resolution adjustment of spectrograph or spectrometer resolution as represented at 410, the controller may determine a corresponding aperture setting and/or entrance slit setting from a lookup table previously stored in memory accessible by the controller as represented at 430.

A representative lookup table is shown below for an embodiment having five entrance slits and a fixed aperture with aperture settings corresponding to whether the fixed aperture is positioned in the optical path of the input beam (as indicated by "With" entries in the table) or removed from the optical path of the input beam (as indicated by "Without" entries in the table) by an associated actuator or positioning mechanism. Other embodiments may include lookup tables having aperture settings corresponding to fixed apertures of different size openings, or an opening size of a variable aperture, for example, that may also be used in combination with positioning in the optical path or removing from the optical path of the input beam. As previously described, the availability of at least two aperture settings provides at least two resolutions for each entrance slits. This facilitates a smaller and less expensive system for various applications, such as a fluorometer, for example.

| Resolution Setting/Adjustment | Entrance Slit Setting | Aperture Setting (Without/With Aperture In Optical Path) |
| --- | --- | --- |
| 1 | Slit 1 | With |
| 1.5 | Slit 1 | Without |
| 2 | Slit 2 | With |
| 3 | Slit 2 | Without |
| 5 | Slit 3 | Without |
| 10 | Slit 4 | Without |
| 20 | Slit 5 | Without |

After the controller determines a corresponding aperture setting and/or entrance slit setting from an associated lookup table as represented at 430, the aperture is positioned based on the determined settings as represented at 450. This may include generating a signal to position the aperture using an associated positioning mechanism in the optical path of the input beam downstream of a sample prior to the entrance to the spectrometer as represented at 452. The aperture may be positioned upstream or downstream of a focusing element as previously described. Similarly, the determined aperture setting may be associated with removing the aperture from the optical path of the input light beam as represented at 454. In one or more embodiments, the controller may generate a signal to select an aperture size as represented at 456 to control a variable or adjustable aperture as represented at 458, or to position one of a plurality of different size fixed apertures as represented at 460. A plurality of fixed apertures may be provided on an aperture plate that is rotated or translated to position a selected aperture in the optical path of the input light beam. As previously described, positioning an aperture having an opening that is large enough to pass substantially all of the input light beam is equivalent to removing the aperture from the optical path.

As also illustrated in FIG. 4, the system or method may include automatic coordinated control of an entrance slit plate as generally represented at 470 by generating a signal to position a slit plate having a plurality of slits so that a selected one of the plurality of slits is positioned in the optical path of the input light beam between the aperture position and the fixed concave diffraction grating of the spectrometer as represented at 472. The selected entrance slit and corresponding slit plate position may be determined based on the requested resolution setting or adjustment using a previously stored lookup table as described above.

FIG. 5 is a flowchart illustrating operation of an optical system or method according to one or more representative embodiments of the present disclosure. In response to an input requesting finer spectrograph or spectrometer resolution as represented at 510, the controller may generate a signal to position an aperture in an optical path of the input light beam downstream of a sample prior to entering the spectrometer as represented at 520. For embodiments having a variable aperture, or an aperture plate having multiple fixed apertures, a selected aperture or aperture size may be positioned in the optical path as represented at 524.

As also illustrated in FIG. 5, in response to an input requesting increased throughput or associated coarser resolution as represented by "N" at 510, the controller may generate a signal to remove an aperture from the optical path of the input light beam prior to entering the spectrometer as represented at 530. For embodiments having a variable aperture or an aperture plate with one or more fixed apertures, step 530 may include selecting a larger aperture to provide a similar result as previously described. The system or method may also include automatic coordinated control of an entrance slit plate as generally represented by selecting a slit size 540 and generating a signal to position a slit plate 550 having a plurality of slits so that a selected one of the plurality of slits is positioned in the optical path of the input light beam between the aperture position and the fixed concave diffraction grating of the spectrometer. The controller may include a lookup table or other stored memory structure to determine the aperture setting and slit size in response to a signal requesting a corresponding spectral resolution or throughput.

As those of ordinary skill in the art will appreciate, one or more of the previously described and illustrated embodiments may provide associated advantages including selective control of resolution of a spectrometer using an external optical element to provide greater flexibility to manage resolution and throughput for more diverse applications. The selective positioning of an aperture downstream of a sample and upstream of the entrance slit in combination with selection of one of a number of entrance slit sizes provides a greater number of bandwidth selections than the available number of entrance slits. Use of an aperture with automatic control upstream of a spectrometer input improves spectral resolution for smaller entrance slit settings without changing internal components of the spectrometer, such as the grating or the detector.

While representative embodiments are described above, it is not intended that these embodiments describe all possible forms of a system or method for surface characterization of porous solids and powder materials according to the present disclosure. The words used in the specification are words of description rather than limitation, and it is understood that various changes may be made without departing from the spirit and scope of the disclosure. As previously described, the features of various representative embodiments may be combined in ways that are not explicitly illustrated or described to form further embodiments. While various embodiments may have been described as providing advantages or being preferred over other embodiments or prior art implementations with respect to one or more desired characteristics, as one of ordinary skill in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, operation, etc. Any embodiments described herein as less desirable than other embodiments or prior art implementations with respect to one or more characteristics are not outside the scope of the disclosure and may be desirable for particular applications.

What is claimed is:

1. An optical system, comprising:
   an aperture positioning mechanism configured to selectively position a circular aperture in an optical path of an input light beam downstream of a sample;
   a slit plate having a plurality of rectangular entrance slits arcuately positioned on the slit plate, each configured to be selectively rotated into position in the optical path of the input light beam downstream of the circular aperture;
   a fixed, non-moveable concave diffraction grating positioned to receive at least a portion of the input light beam passing through a selected one of the plurality of rectangular entrance slits and to diffract the light beam at a wavelength-dependent angle; and
   a detector positioned to receive light diffracted from the concave diffraction grating and configured to generate a signal in response to the light diffracted from the concave diffraction grating.

2. The optical system of claim 1 wherein the aperture positioning mechanism is configured to selectively either position the circular aperture into the optical path of the input light beam, or to remove the circular aperture from the optical path of the input light beam.

3. The optical system of claim 1 wherein the aperture positioning mechanism comprises at least a second aperture, the second aperture being larger than the circular aperture, wherein the positioning mechanism positions a selected one of the circular aperture and the second aperture in the optical path of the input light beam.

4. The optical system of claim 3 wherein the second aperture is sized to pass substantially all of the input light beam.

5. The optical system of claim 1 wherein each of the plurality of entrance slits comprises a common height and different width relative to all other ones of the plurality of entrance slits.

6. The optical system of claim 5 further comprising a motor associated with the slit plate, the motor configured to position a selected one of the plurality of entrance slits relative to the input light beam.

7. The optical system of claim 1 wherein the concave diffraction grating comprises a holographic grating.

8. The optical system of claim 7 wherein the concave diffraction grating comprises an aberration corrected holographic grating.

9. The optical system of claim 1 further comprising a housing, wherein the concave diffraction grating and the detector are positioned within the housing, the concave diffraction grating is fixed to the housing, and the aperture is positioned outside of the housing.

10. The optical system of claim 1 wherein the aperture has a fixed opening.

11. The optical system of claim 1 wherein the aperture comprises an iris having an adjustable opening.

12. The optical system of claim 1 wherein the system has a focal length of less than 100 mm.

13. An optical system comprising:
a spectrograph comprising:
a fixed, non-rotatable concave diffraction grating positioned to receive an input light beam from a sample and to diffract the input light beam at a wavelength-dependent angle; and
a detector positioned to receive light diffracted from the concave diffraction grating and to generate signals in response to the light received from the concave diffraction grating;
a positioning mechanism configured to selectively position an aperture either into, or out of, an optical path of the input light beam after passing through the sample and prior to entering the spectrograph;
a slit plate having a plurality of entrance slits positioned downstream of the aperture and movable by an actuator to position one of the plurality of entrance slits in the optical path of the input light beam; and
a controller coupled to the detector, the positioning mechanism, and the actuator, the controller configured to automatically control the positioning mechanism and the actuator to selectively position the aperture and the slit plate in response to a selected resolution for light received by the detector of the spectrograph.

14. The optical system of claim 13 wherein the spectrograph has a focal length of less than 100 mm.

15. The optical system of claim 13 wherein the concave diffraction grating comprises a holographic aberration-corrected concave diffraction grating fixed to the spectrograph.

16. The optical system of claim 13 wherein each of the plurality of slits has a common height and a different width.

17. The optical system of claim 13 wherein the positioning mechanism is configured to selectively position one of a plurality of apertures into the optical path of the input light beam.

18. A method for controlling resolution of a spectrograph having a concave diffraction grating configured to diffract an input light beam to a detector, comprising, by a controller:
in response to a signal requesting finer spectrograph spectral resolution, generating a signal to automatically position an aperture in an optical path of the input light beam after passing through a sample prior to entering the spectrograph; and
in response to a signal requesting coarser spectrograph spectral resolution, automatically generating a signal to remove the aperture from the optical path of the input light beam.

19. The method of claim 18 further comprising, by the controller, generating a signal to position a slit plate having a plurality of slits so that a selected one of the plurality of slits is positioned in the optical path of the input light beam upstream of the concave diffraction grating of the spectrograph.

20. The method of claim 19 wherein each of the plurality of slits has a common height and a different width.

21. The method of claim 18 wherein the aperture is configured to pass half of the input light beam.

22. The method of claim 18 further comprising, by the controller:
retrieving an aperture setting and an entrance slit setting from a previously stored lookup table corresponding to the input signal requesting finer spectrograph spectral resolution or the input signal requesting coarser spectrograph spectral resolution;
controlling positioning of the aperture in response to the aperture setting; and
controlling positioning of a slit plate having a plurality of slits so that a selected one of the plurality of slits is positioned in the optical path of the input light beam between the aperture and the concave diffraction grating of the spectrograph in response to the entrance slit setting.

23. The optical system of claim 1 further comprising:
a slit plate positioning mechanism configured to hold the slit plate; and
a controller configured to control the aperture positioning mechanism and the slit plate positioning mechanism to automatically position a selected one of the plurality of entrance slits and to select a position and position the circular aperture in the selected position in response to a user-selected resolution.

24. The optical system of claim 1 wherein at least a portion of a beam path of the input light beam comprises a collimated input light beam, and wherein the aperture positioning mechanism selectively positions the circular aperture in the collimated portion of the input light beam.

25. The optical system of claim 5 wherein the common height of the plurality of entrance slits corresponds to a height of the concave diffraction grating.

* * * * *